United States Patent

Nichols et al.

[11] Patent Number: 5,431,437
[45] Date of Patent: Jul. 11, 1995

[54] HORN ACTUATOR FOR A STEERING WHEEL WITH AN AIR BAG UNIT

[75] Inventors: Lawrence R. Nichols, Dover; Bruce Woodward; William C. Delatore, both of Rochester, all of N.H.

[73] Assignee: Davidson Textron Inc., Dover, N.H.

[21] Appl. No.: 865,296

[22] Filed: Apr. 8, 1992

[51] Int. Cl.6 .............................................. B60R 21/20
[52] U.S. Cl. ..................... 280/731; 200/61.54
[58] Field of Search ............... 280/728 R, 728 B, 731, 280/743 R; 200/61.54, 61.55, 61.57, 81 H, 505

[56] References Cited

U.S. PATENT DOCUMENTS

| | | | |
|---|---|---|---|
| 2,562,847 | 7/1951 | Spencer | 60/62.6 |
| 3,104,293 | 7/1963 | Rendler | 200/51 |
| 3,680,912 | 8/1972 | Matsuura | 297/391 |
| 3,901,346 | 8/1975 | Kohls et al. | 180/277 |
| 3,942,603 | 3/1976 | Pesonen | 180/275 |
| 4,250,434 | 2/1981 | Valansot | 315/362 |
| 4,325,568 | 4/1982 | Clark et al. | 280/731 |
| 4,725,083 | 6/1988 | Honda | 280/731 |
| 4,934,735 | 6/1990 | Embach | 280/731 |
| 5,002,306 | 3/1991 | Hiramitsu et al. | 200/61.54 X |
| 5,062,661 | 11/1991 | Winget | 280/731 |
| 5,085,462 | 2/1992 | Gualtier | 280/731 |
| 5,186,490 | 2/1993 | Adams et al. | 280/731 |

FOREIGN PATENT DOCUMENTS

| | | | |
|---|---|---|---|
| 4016047 | 11/1991 | Germany | 280/731 |
| 0143750 | 6/1991 | Japan | 280/731 |
| 0143752 | 6/1991 | Japan | 280/731 |

Primary Examiner—Brian L. Johnson
Assistant Examiner—Peter English
Attorney, Agent, or Firm—Reising, Ethington, Barnard & Perry

[57] ABSTRACT

A steering wheel (12) incorporates an air bag unit (22). The air bag unit has a cover door (30) that has a bladder (38) with an air chamber (39) in communication with a pressure sensor (40). The pressure sensor is incorporated in an electrical circuit (42) that is actuated when the pressure sensor senses pressure within the bladder to be above a predetermined value. The electrical circuit is connected to a horn (44) such that when the bladder is pressed, the horn is actuated.

3 Claims, 3 Drawing Sheets

HORN ACTUATOR FOR A STEERING WHEEL WITH AN AIR BAG UNIT

TECHNICAL FIELD

This invention relates to a steering wheel incorporating a horn actuator within an air bag unit.

BACKGROUND OF THE INVENTION

Steering wheels because of their convenient location have often incorporated switches that actuate various motor vehicle accessories such as speed controls or horns. Steering wheels are also the most convenient location for mounting a driver side air bag. The air bag is often mounted at the hub of the steering wheel.

The incorporation of air bag units within a steering wheel have made the inclusion of horn or other actuating switches within the steering wheel more complicated. Firstly, the air bag unit with its casing and cover door occupy a significant portion of the area within the steering wheel rim. Secondly, the cover door must be free to open upon expansion of the air bag.

Consequently, the horn switch which has traditionally been a relatively large centrally located button at the hub of the steering wheel has been relocated away from the hub and downsized to fit within the remaining space within the rim about the air bag cover door. However, due to the historically conventional practice of locating a horn switch at the hub of a steering wheel, most drivers still feel more comfortable with a horn switch at the hub, particularly when faced with a panic situation. The conspicuous presence of a large pad at the hub further confuses drivers into mistakenly believing the pad is a horn button.

What is needed is a steering wheel having an actuator device incorporated within the air bag cover door at the hub of the steering wheel.

SUMMARY OF THE DISCLOSURE

In accordance with one aspect of the invention, a steering wheel for a motor vehicle includes an air bag unit having a gas generator within a casing. An air bag is operably affixed to the casing for receiving gas from said gas generator. A cover door is mounted over the air bag for concealing the air bag during its stored inactive state. The cover door includes a bladder that is filled with a fluid such as air at an initial rest pressure. The door cover has a deformable section which when deformed changes the pressure within the bladder. A pressure sensor in operable communication with the bladder senses change of pressure for actuating an operably connected electrical device, such as, for example, a horn.

Preferably, the deformable section is depressed for increasing the fluid pressure within the bladder to a value above a predetermined actuating value. In one embodiment, the pressure sensor is operably connected to an electrical circuit that is in turn operably connected to the horn. The electrical circuit actuates the horn when the pressure sensor reads a pressure above the predetermined actuating value. It is also desirable that the bladder is integrally formed within the cover door. In another embodiment, the pressure sensor is in the form of a switch which opens and closes the electrical circuit connected to the horn.

In one embodiment, the deformable bladder section is molded into the air bag cover door. The door tear seam may be positioned in cooperation with the deformable bladder section such that the cover door opens up directly in line with the position of the air bladder. In this embodiment, the air bladder runs substantially the entire length of the air bag cover door.

In one embodiment, the air bladder may have a small vent to the exterior to compensate for temperature variations or other changes in pressure due to ambient surroundings. The vent does not interfere with the function of the bladder due to the fact that the pressure exerted by an operator is relatively large compared to the changes due to temperature or ambient air pressure changes. Secondly, the motor vehicle horn needs only to be actuated for short durations not exceeding a few seconds such that any bleeding through the vent during a normal horn duration does not significantly decrease the pressure in the bladder to deactuate the horn.

A broader aspect of the invention relates to a deformable bladder mounted in proximity to a hub of a steering wheel and contains a fluid which can be pressurized within said bladder. A pressure sensor is in operable communication with said bladder for sensing the fluid pressure and is operably connectable to an electrical circuit which in turn is operably connectable to an electrical device, for example, a horn which is actuated when the pressure sensor senses the actuating pressure within the bladder.

BRIEF DESCRIPTION OF THE DRAWINGS

Reference now is made to the accompanying drawings in which.

DETAILED DESCRIPTION OF THE PREFERRED EMBODIMENTS

Figure 1:
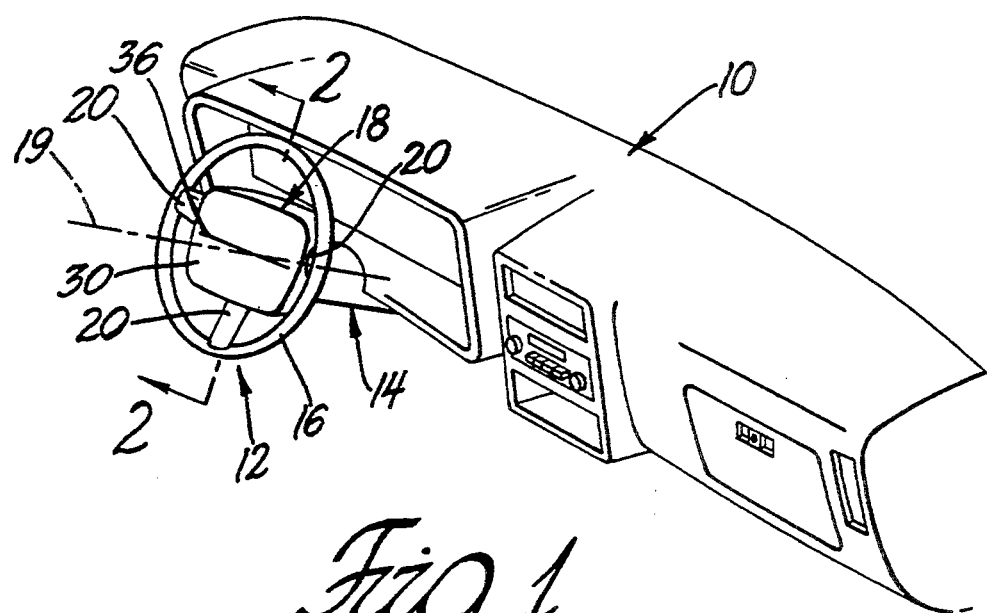
FIG. 1 is a perspective view of a motor vehicle dashboard incorporating a steering wheel in accordance with the invention.
Figure 2:
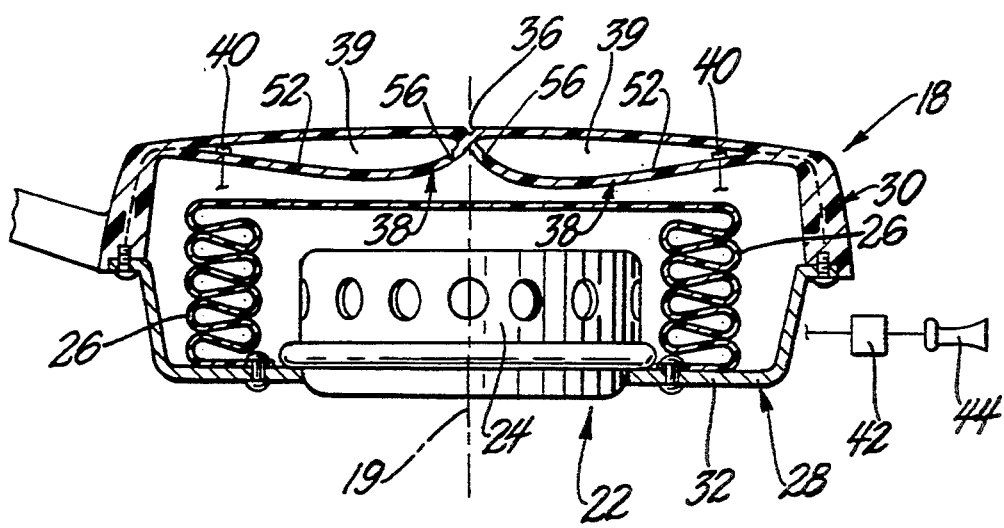
FIG. 2 is a partially schematic and cross-sectional view taken along lines 2—2 shown in FIG. 1.

As shown in FIG. 1, a motor vehicle dashboard 10 includes a steering wheel 12 mounted at the upper end of a steering column 14. The steering wheel 12 has a rim 16 attached to a hub section 18 via a plurality of spokes 20. The hub 18 is mounted at the central axis 19 of the steering column 14. As shown in FIG. 2, the hub section 18 incorporates an air bag unit 22 with a gas generator 24 and an air bag 26 operably connected about the gas generator to receive any gas emanating from the generator. The gas generator 24 and air bag 26 are mounted inside a casing 28. The casing 28 includes a bottom half 32 and a cover door 30 that is mounted to the bottom half 32 and is normally closed to conceal the casing bottom half 32, gas generator 24 and air bag 26.

The cover door 30 is blow molded from semi-flexible TPE, TPR or similar plastic material. The door 30 includes a tear seam 36 which allows the door 30 to open upon deployment of the air bag unit 22. The door 30 also includes a pair of integrally formed bladders 38 having a pressure chamber 39 located at each side of the tear seam 36 and filled with air. A pressure transducer 40 is mounted within each bladder chamber 39 and is responsive to the change in pressure within the chambers 39. The transducers 40 form part of and are operably connected to a horn actuator circuit 42 which actuates horn 44 upon the appropriate signal from the transducer 40 which corresponds to a predetermined actuating pressure.

Figure 3:
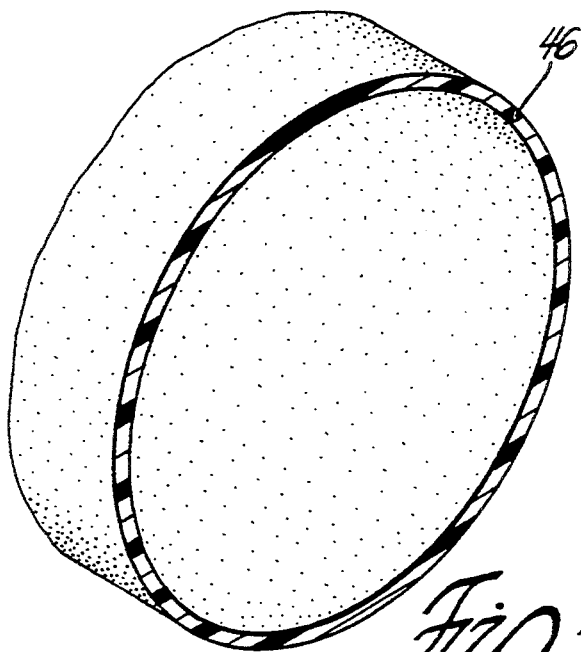
FIG. 3 is a fragmentary and partially segmented view of a blow molded member that is to be formed into the door cover and bladder shown in FIG. 2.
Figure 4:
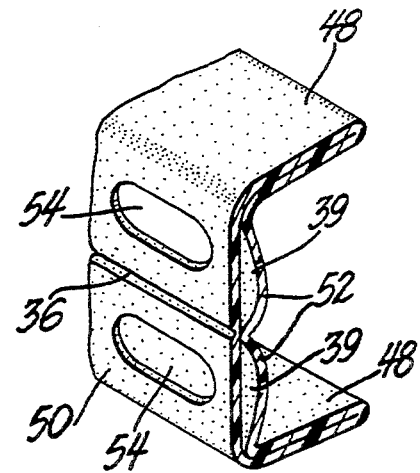
FIG. 4 is a view similar to FIG. 3 showing the cover door and bladder partially formed after a secondary press action.

The door 30 is made from a blow molded form 46 as shown in FIG. 3. The form 46 undergoes a secondary press action to form side walls 48, front wall 50, rear bladder walls 52, tear seam 36 and deformable horn actuator buttons 54 as shown in FIG. 4. Each chamber 39 is in communication with a small vent 56 at the rear bladder walls 52. The vents 56 allow for a slow release of air when the temperature within the bladder is elevated such that the temperature rise does not actuate the horn 44. In contrast, upon a decrease in temperature, the vents 56 allow for a slow air flow into chambers 39.

In operation, an operator merely presses the deformable front wall 50 of the door cover 30 when the horn is desired. The pressing of the front wall 50 deforms the wall inwardly thereby decreasing the volume of the chamber 39 and consequently significantly increasing the air pressure within the bladder chamber 39 to a point above an actuating pressure which is sensed by the transducer 40. The circuit 42 connected to the transducers 40 actuates the horn 44 when the actuating pressure within either chamber 39 is sensed.

The vents 56 do not interfere with the operation of the horn 44 because the release of air by vents 56 from chambers 39 is slow. The slow release of air does not lower the increased pressure within chamber 39 caused by deformation of the front wall 50 or buttons 54 within the foreseen short duration of continuous actuation for horns in a motor vehicle.

The transducers 40 by being encased within the door 30 eliminates any separate parts that would become a projectile upon deployment of the air bag unit 22.

Figure 5:
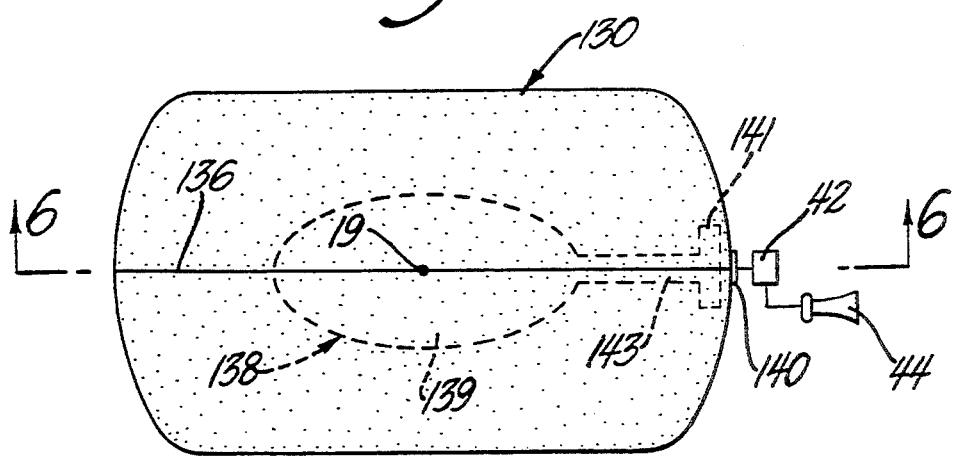
FIG. 5 is a plan and partially schematic view of an alternate air bag unit cover door and horn actuator in accordance with the invention.
Figure 6:
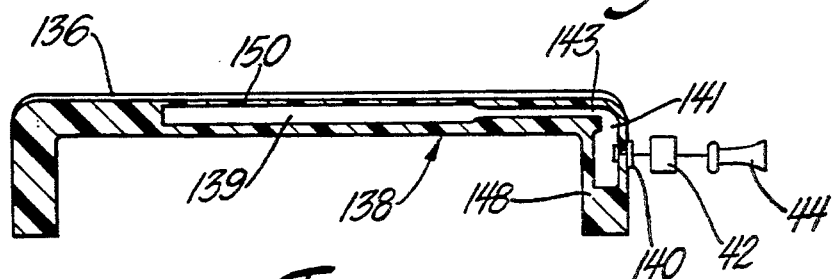
FIG. 6 is a cross-sectional view taken along line 6—6 shown in FIG. 5.

An alternate embodiment is illustrated in FIGS. 5 and 6. The cover door 130 has a integrally formed bladder 138 with a central large chamber 139 and a smaller chamber 141 located within the side wall 148 of the cover door 130. A passage 143 extends between the two chambers 139 and 141. The door 130 is mounted on the steering wheel such that the centrally located chamber 139 is located about a center axis 19 of hub 18. A pressure switch 140 is mounted in proximity to the small chamber 141 and is operably in communication therewith. The pressure switch 140 is actuated between an open and closed position. The tear seam 136 runs along a midline of the cover door 130 and can be located above the larger chamber 139.

Operation of the horn 44 is similar as the first embodiment. Pressure exerted by an operator's hand on the cover door front wall 150 over chamber 139 deforms the front wall 150 to increase the pressure within the chamber 139, passage 143 and chamber 141. The increase in pressure above a predetermined value actuates the pressure switch 140 to its closed position. The pressure switch 140 is operably connected to horn 44 and actuates it when in the closed position.

The switch 140 is located at the side of the door 130 and does not undergo the large acceleration and displacement that the front wall 150 undergoes upon deployment of the air bag unit and opening of the door 130.

Figure 7:
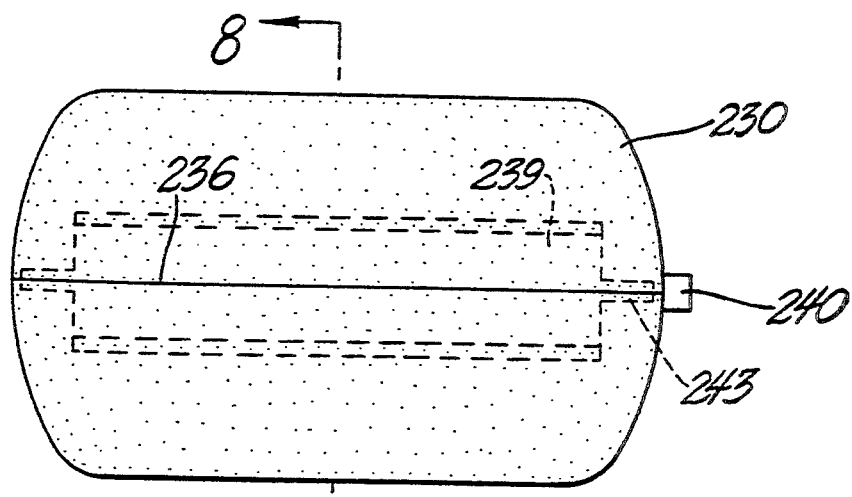
FIG. 7 is a plan view of a third embodiment in accordance with the invention.
Figure 8:
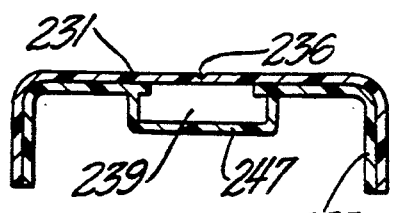
FIG. 8 is a cross-sectional view taken along line 8—8 shown in FIG. 7.

Another embodiment is illustrated in FIGS. 7 and 8. The door 230 is made from a sandwich of different layers. A top layer 231 is made from a flexible material and is adhered to a bottom layer 233 of a semi-rigid plastic substrate. The air chamber 239 is formed in part by a U-shaped channel 247 in the bottom layer and covered by the top flexible layer 231. More specifically, as best seen in FIGS. 7 and 8, the U-shaped channel 247 has parallel edges thereon that are adhered to the flexible top layer 231. The chamber 239 runs substantially the entire length of cover door 230. The tear seam 236 is aligned over and runs with the chamber 239. The U-shaped channel in the substrate causes a natural weak seam therealong resulting in a natural location for the cover 230 to open below tear seam 236. The tear seam 236 may be eliminated if the top layer 231 also naturally tears over the u-shaped channel upon deployment of the air bag. As with the previous embodiment, the pressure switch 240 is located at the side of door 230 in communication with a passage 243 which leads from chamber 239.

Figure 9:
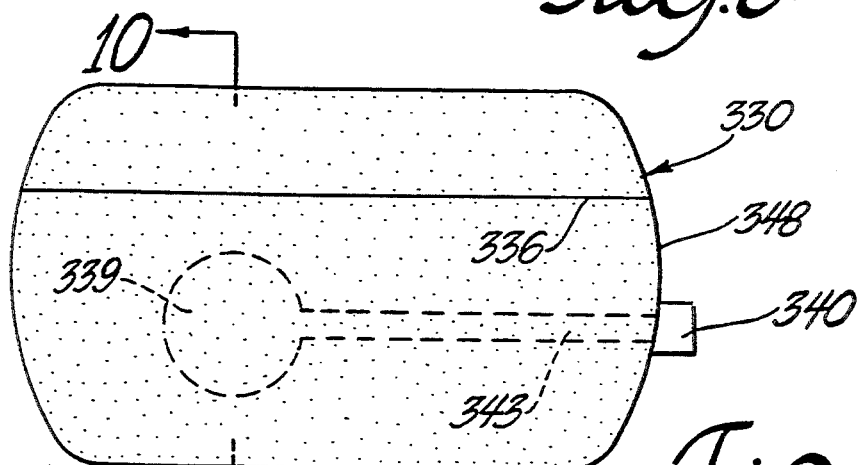
FIG. 9 is a plan view of a fourth embodiment in accordance with the invention.
Figure 10:
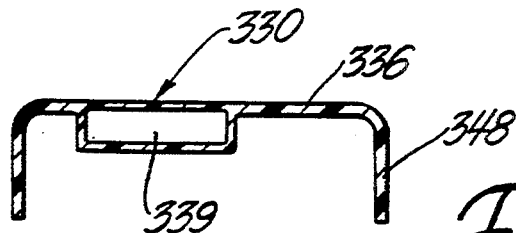
FIG. 10 is a cross-sectional view taken along line 10—10 shown in FIG. 9.

Another cover door 330 is illustrated in FIGS. 9 and 10. In this embodiment, the chamber 339 is eccentrically placed and is misaligned from eccentrically placed tear seam 336. The chamber 339 which is formed integrally in door 330 is in communication with passage 343 which in turn is in communication with pressure switch 340 located at side wall 348 of door 330.

While air is an expedient gas to be used within the pressure chambers, it is foreseen that other fluids whether gaseous or liquid may be used instead.

Other variations and modifications of the invention are possible without departing from its scope and spirit as defined by the appended claims.

The embodiments in which an exclusive property or privilege is claimed are defined as follows:

1. An air bag cover assembly comprising a door having a top layer of flexible material and a bottom layer of semi-rigid plastic;
   a U-shaped channel formed solely in said bottom layer below said top layer and extending across the width of said door; said U-shaped channel having parallel edges thereon; said top layer adhered to said parallel edges to form a single air chamber therebetween;
   a side passage formed in said bottom layer having opposite open ends; one of said opposite open ends communicating with said air chamber;
   said door having a side; a pressure switch supported on said side and the other of said opposite open ends communicating with said pressure switch.

2. In the air bag cover assembly of claim 1, said top layer of flexible material having a tear seam formed therein overlying and extending parallel to said U-shaped channel.

3. In the air bag cover of claim 2 said air chamber symmetrically located in said bottom layer.

* * * * *